Patented Dec. 19, 1944

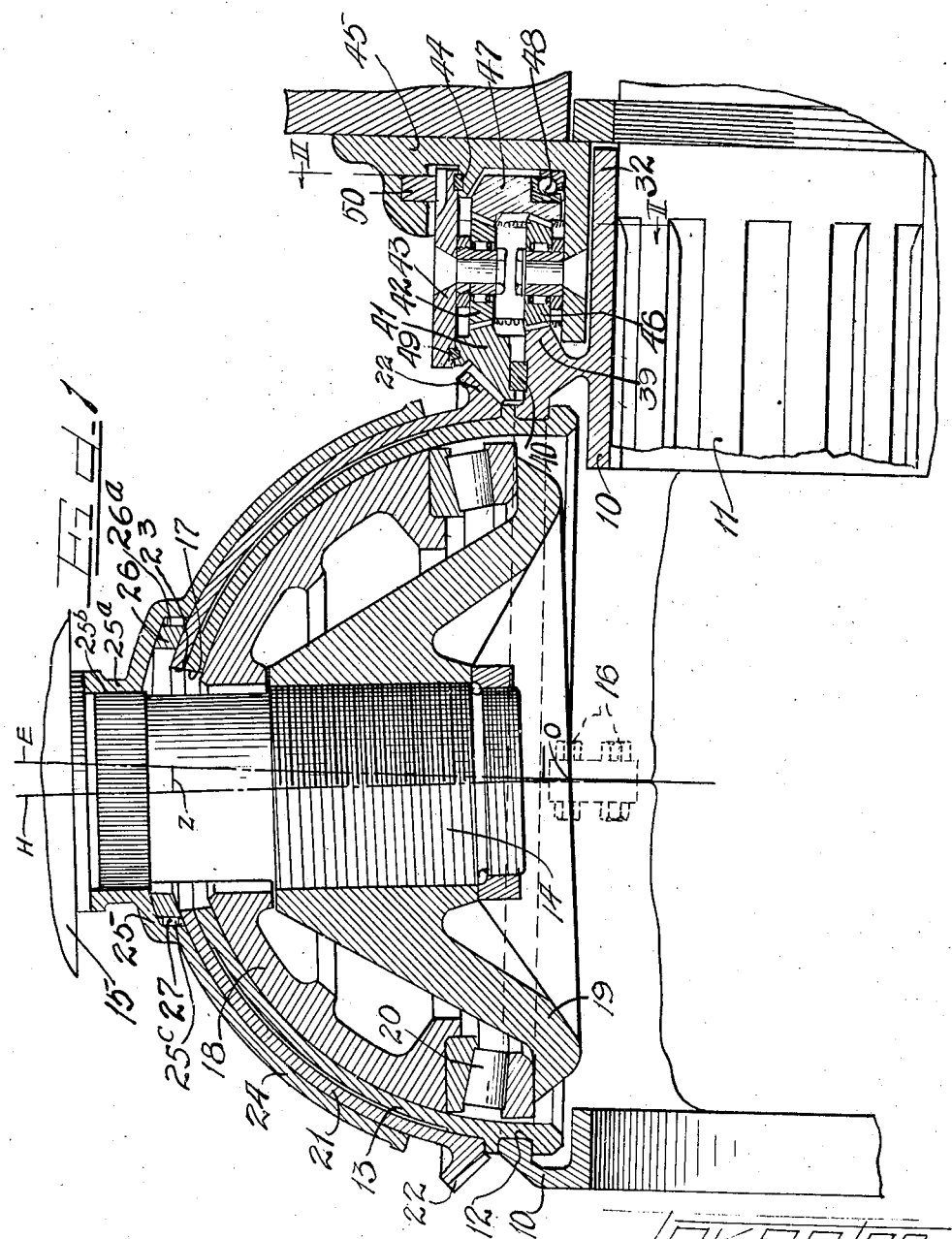

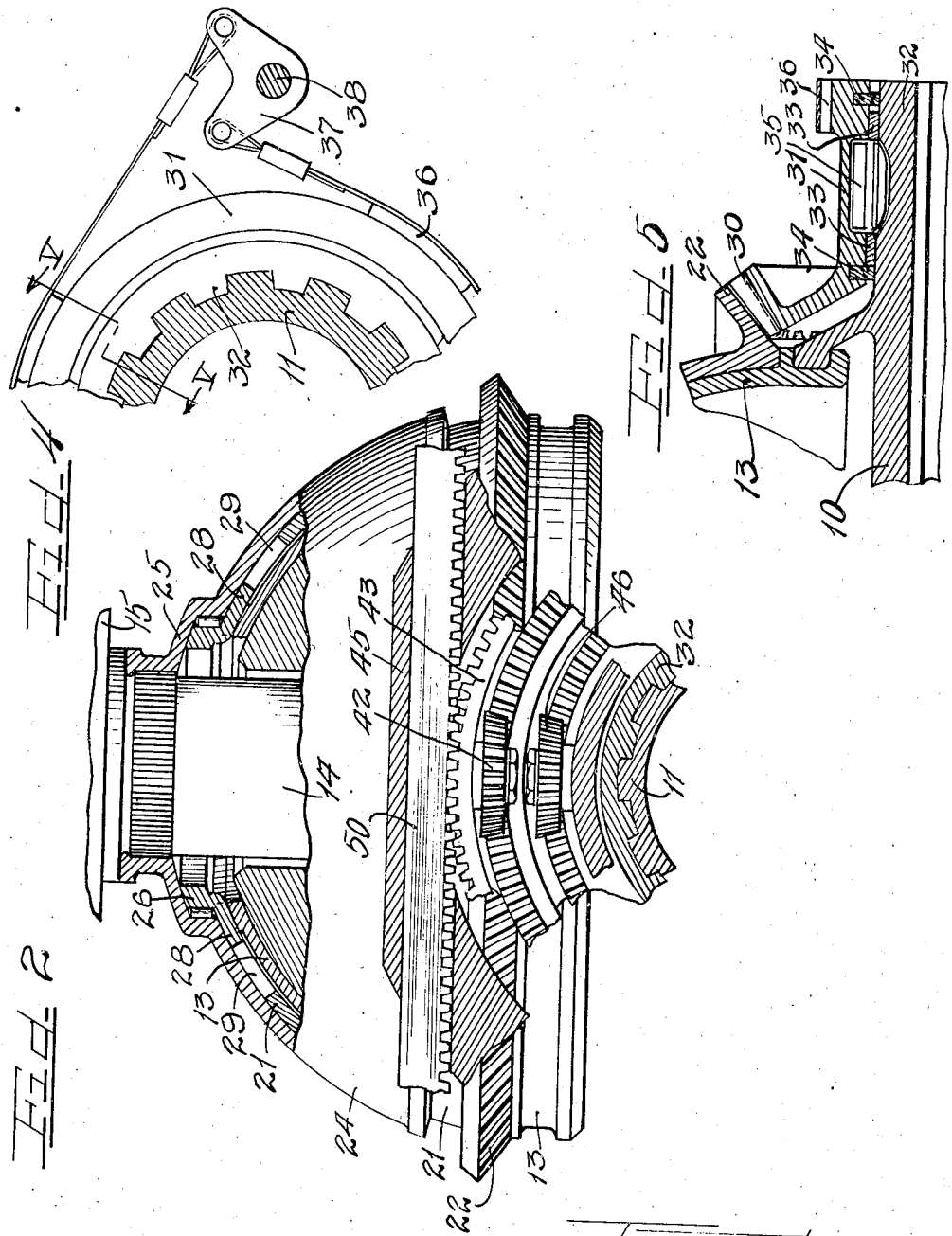

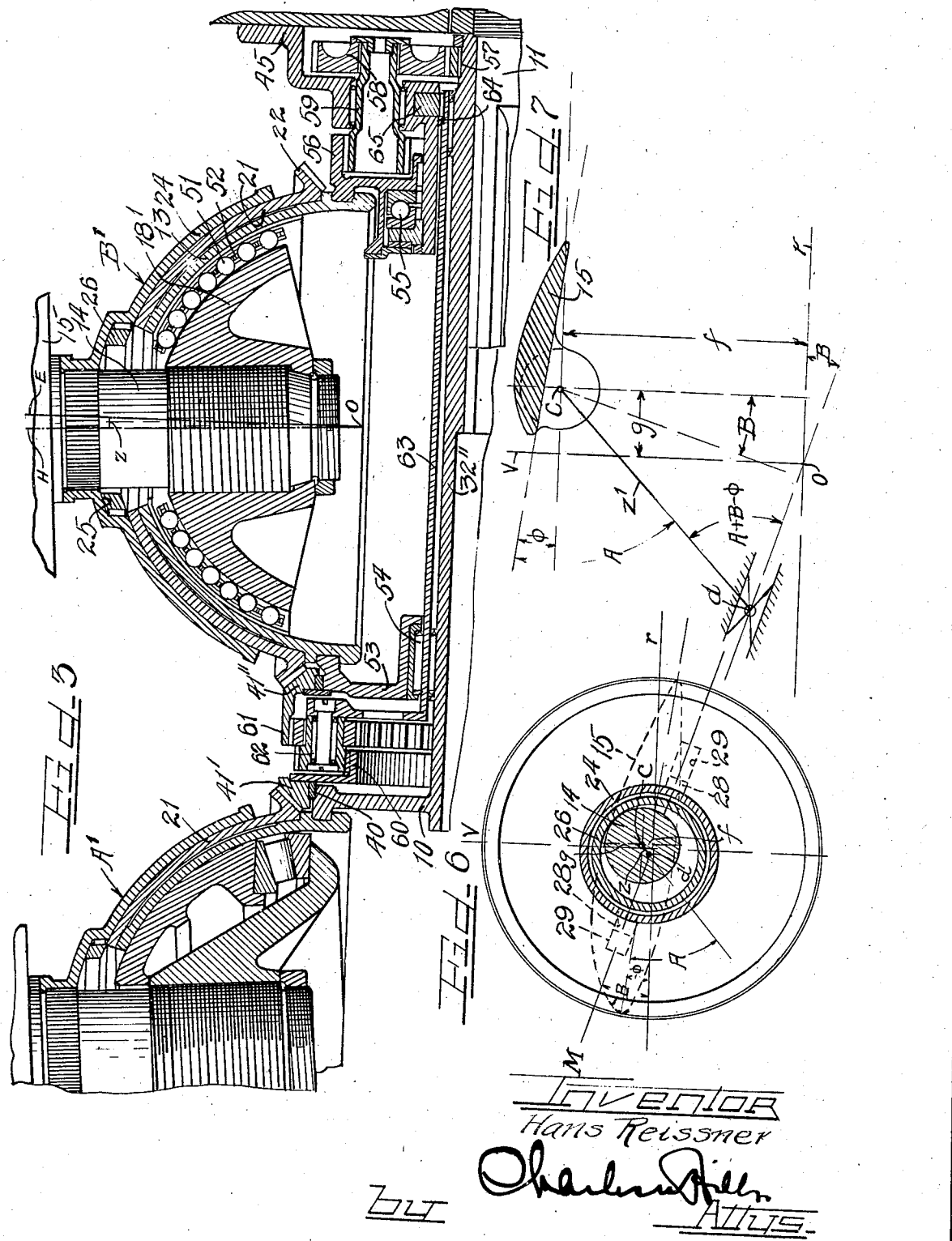

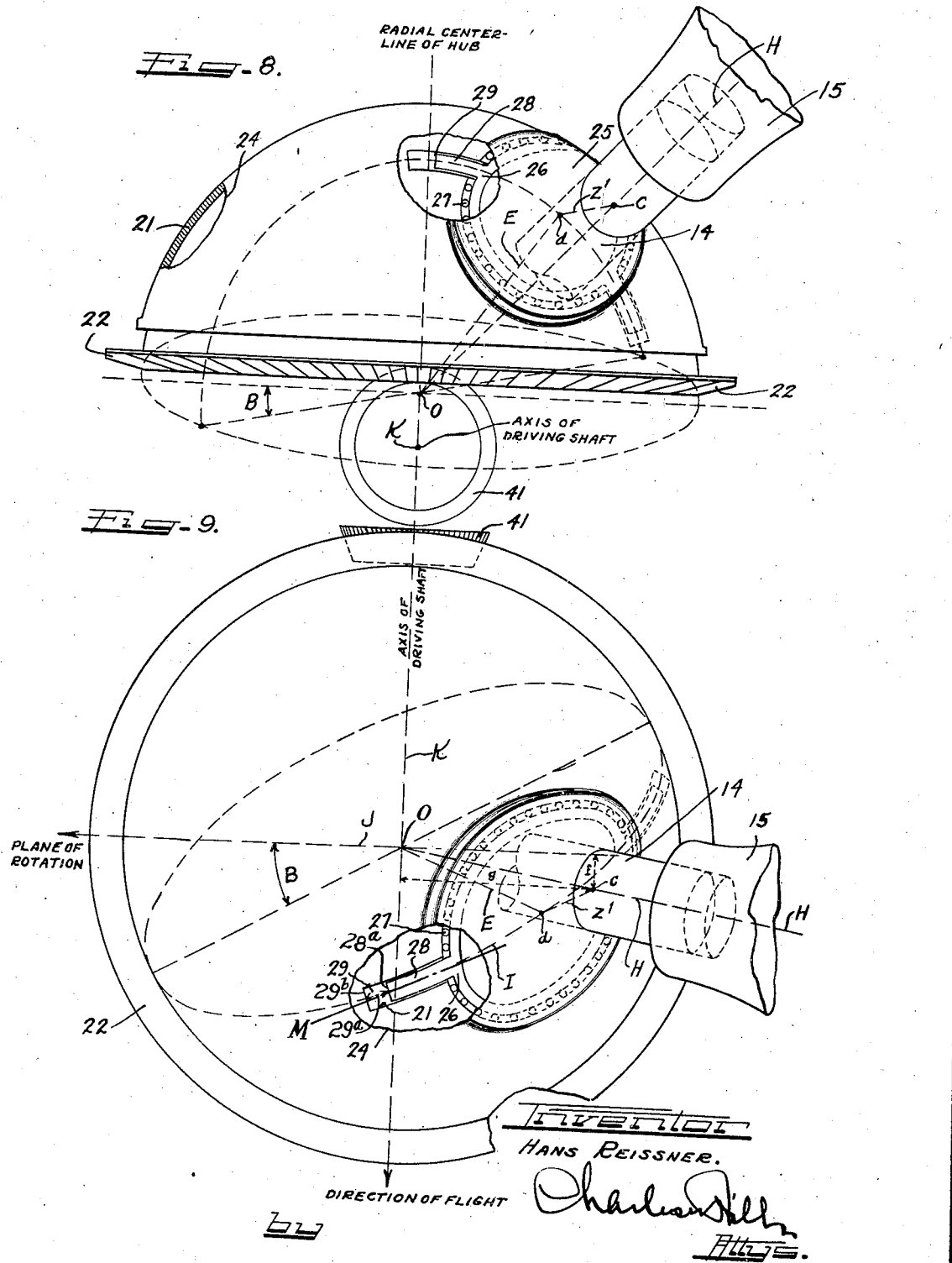

2,365,214

UNITED STATES PATENT OFFICE 2,365,214

SCREW PROPELLER, PARTICULARLY FOR AIRCRAFT

Hans Reissner, Chicago, Ill.

Application October 5, 1940, Serial No. 359,923

10 Claims. (Cl. 170—163)

The present invention relates generally to screw propellers, particularly for aircraft, and is especially concerned with improved means for automatically adjusting the pitch angle of the blades to obtain the suitable angle for a number of revolutions per minute for a given set of flight conditions at power output of the engine, and for a lower number of R. P. M. by throttling the engine; which will, in addition to the above, automatically adjust the blades to feathering and reverse torque positions; and which may be automatically or manually controlled during flight to accommodate the automatic system for additional flight conditions.

Many suggestions have come forward to make the blade movable relative to the hub for the purpose of utilizing the equilibrium between torque, thrust and centrifugal force to automatically adjust the blade angle. These suggestions did not eliminate the bending movement occurring in the blade root and its bearings; furthermore, they had too few and too difficult adjustments to properly service the different states of flight of prescribed numbers of revolutions and prescribed values of engine power.

My present invention utilizes only the equilibrium between one component of the air forces and the centrifugal force, allowing free play for the other component, preferably the torque component, by combining a universal joint bearing with an eccentric journal bearing arranged to slide on the former bearing along a path which may be fixed or adjustable as to direction.

Some of the principal advantages resulting from this new arrangement may be noted as follows:

a. In the present invention, it is an object to provide a self-adjusting variable pitch screw propeller in which the blades are mounted so as to freely swivel on a universal joint bearing without any bending moments at the roots of the blades, whereby the blades may be made of lighter constructions than in the usual arrangements, the gyratory forces on the airplane decreased, the blade sections brought into close proximity to the hub, and a higher natural vibration frequency of engine shaft-propeller system obtained.

b. It is a further object of the present invention to provide an improved screw propeller arrangement in which the blades will be automatically adjusted so as to effect for a given engine torque, given velocity of flight and given density of air a prescribed number of revolutions, that is a prescribed rotational speed, for the three conditions or states of flight deemed most important, for example, take off, climbing and maximum velocity.

c. It is a further object of the herein described invention to provide a screw propeller which in addition to the foregoing is so arranged that its blades when the engine is not running will automatically be adjusted to a feathering position at torque zero and minimum drag for flying or gliding, and which will also be automatically adjusted to a high pitch position of slow rotational speed during a steep glide.

d. A still further object is to provide in screw propellers of the herein described type, novel control means either for fine correction or for additional states of flight for varying and adjusting the rotational speed during flight, which may be directly accomplished manually by the pilot, by a governor or by changing the speed setting of such a governor; and in which provision is made to enable the pilot to reverse the pitch of the blades for negative thrust using the same lever, handle or other control means that may be utilized for changing the rotational speed, and which may be arranged to automatically return to normal position upon being released.

e. Still another object is to provide a screw propeller and control mechanism of such construction that its features may with equal facility be embodied in either a single propeller or counter-rotating propeller system.

All the members of the structure can be arranged outside the central part of the hub so as to provide a free passage or channel through the hub structure, this being particularly desirable and advantageous in airplanes for military use.

f. In carrying the invention into effect according to one feature, it is proposed to support each blade at the propeller hub by means of a spherical bearing which enables free swivel or rotational movement of the blade. Such spherical bearings have in general been suggested very early in the development of the screw propeller, but in the present invention additional advantages have been secured by combining such bearings with other elements to form a mechanism for enforcing an automatic adjustment of the blade pitch angles, and wherein equilibrium is established at each required angular position of the blades between the corresponding aerodynamic forces of thrust and torque and the centrifugal forces of the blades.

The forces in all the elements of the pitch changing mechanism are kept small because the centrifugal forces of the blades are transmitted through the spherical bearings to the hub without passing through the pitch changing mechanism. Such an arrangement is especially adapted for normal or automatic adjustments, since it is not necessary to deal with excessive forces which would be difficult and impracticable to handle. It is only necessary in order to adjust the mechanism for different flight conditions to change the conditions of equilibrium between the aforementioned forces.

More specifically, it is proposed to provide a journal bearing or other suitable lateral support for the root of each blade, this bearing having an axis enclosing an acute angle with the centroid axis of the associated blade whereby the term "acute" signifies an angle of the generally small order of magnitude of the ratio of thrust and centrifugal force; and constrained in a suitable manner as by a tongue and groove connection for lateral movements along a path predeterminable in shape and direction. In a paragraph below the exact determination of this small angle by means of equations is given. By virtue of the acting forces the blade will be rotated and the journal shifted along said path to a position in which the blade will have the proper pitch for the flight condition imposed by the control surfaces of the airplane and the engine torque and the forces at this position of the blade will be in equilibrium. For varying the conditions of equilibrium for fine correction or additional states of flight and for reversing the thrust appropriate means are provided for varying the direction of the path of movement of the journal bearing, and for such purpose I have chosen to disclose a differential gear arrangement and also a brake mechanism which permit the variations to be made during flight, although it will be obvious that other mechanisms may be utilized for such purpose.

Other objects and features of the invention will more fully appear from the following detailed description taken in connection with the accompanying drawings, which illustrate several embodiments thereof, and in which:

Figure 1 is a fragmentary view including in part a longitudinal section of a single multi-blade propeller (the mounting for one blade only being shown) embodying the features of the present invention;

Figure 2 is a fragmentary view of the same including a transverse section taken substantially on line II—II of Figure 1, and having certain of the parts shown in elevation and other parts broken away to disclose important details of the blade mounting;

Figure 3 is a fragmentary view including in part a longitudinal section of counter-rotating multi-blade propellers embodying the features of the present invention;

Figure 4 is a fragmentary elevational view of a construction of control means for manually varying the propeller pitch for reverse torque operation;

Figure 5 is a fragmentary sectional view through the same, taken substantially on line V—V of Figure 4, and showing its interconnection with the pitch-varying mechanism;

Figures 6 and 7 are views more or less schematically showing the relative positions of the various elements of the pitch-varying mechanism and a mathematical consideration of the action of these elements.

Figure 8 is a schematic view of the structure shown in Figure 1 looking rearwardly of the mounting assembly; and Figure 9 is a plan view of the structure shown in Figure 8.

As shown on the drawings:

Referring to Figure 1, there is shown a single propeller or air screw construction embodying the features of the present invention in which a hub 10 of hollow construction is splined or otherwise secured to a propeller shaft 11. This hub is provided with circumferentially spaced openings 12, the number of these openings depending upon the number of propeller blades to be incorporated in the propeller. In each of these openings, there is mounted a spherical shell 13 which forms a bearing element for a mounting bolt 14 at the root end of the propeller blade 15. In order to facilitate mounting of the spherical shell in the hub opening 12, the hub may consist of two halves joined circumferentially and secured together as by bolts 16.

The bolt 14 extends through a central opening 17 of the spherical shell 13 and carries a journal member 18 of spherical construction, the surface of this journal member being in sliding engagement with the inner surface of the spherical shell. The journal member is retained on the bolt by a nut 19 which threadedly engages the bolt and has bearing engagement with the journal member 18 through anti-friction means such as roller bearings 20.

The spherical bearing just described transmits the centrifugal force of each propeller blade to the hub structure and permits rotation of the blade about an axis defined below as well as slight tilting or rotary movements about axes transverse to the axis of the bolt.

Embracing the outside of the shell 13 is a shell 21 which is supported for rotative movement about a radial axis of the hub and carries at its edge a bevel gear 22 which cooperates with another gear to be described later and by means of which this shell may be rotated about an axis passing through the center of the sphere perpendicular or substantially perpendicular to the axis of the propeller shaft. As in the case of the spherical shell 13, the shell 21 is likewise provided with a central opening 23 for the passage of the bolt 14 therethrough. The openings 17 and 23, it will be noted, have sufficient clearance around the bolt to allow a small angular tilting movement of the bolt from a position perpendicular to the propeller shaft, the amount of this movement corresponding to the change in equilibrium between the centrifugal force and the aerodynamic forces of thrust and torque of the blade.

Slidably embracing the outer surface of spherical shell 21 is an outer spherical shell 24 having a central inwardly opening socket 25 adapted to receive therein for movement over the outer surface of shell 21 a ring 26 of the journal bearing 25, 26, 27. The outer wall 26a of the journal ring 26 and the inner wall surface 25c of socket 25 (see Fig. 1) form the bearing surfaces between which antifriction elements, such as the needle bearings 27 are disposed. Socket 25 is provided with a neck portion 25a. The blade bolt 14 having a median axis H, Fig. 1, passes through the socket 25 and is secured by serrated connection 25b with socket neck 25a. This connection is so disposed as to have a predetermined eccentricity with reference to the central axis E of journal bearing 25, 26, 27, the eccentricity being defined by an angle Z between axis E and axis H, Fig. 1. The shell 24 prevents axial inward movement of the blade bolt 14 towards the propeller shaft, but it permits rotary movement of the blade bolt 14 and the blade about axis E of the journal bearing 25, 26, 27 ring 26 of the bearing being connected with shell 21 by tongues 28 and slot 29, Figs. 2, 6, 8, 9, to rotate with the shell, as more specifically described below. Provision is made for the free movement of axis E of journal ring 26 along a surface of predetermined shape and direction, this surface being defined by the median M of slot 29, Figs. 8, 9, and the center (O) of the spherical bearing (13, 18). This movement is accomplished, as shown in Fig. 2 and in dotted lines in Figs. 8, 9, by providing the journal ring 26 with diametrically disposed tongues 28, these tongues extending movably into slots 29 provided in spherical shell 21. With this adjustment it will be apparent that rotation of the shell 21, for instance, by gear 22, 41, will rotate the journal ring 26 due to the tongue and slot connection 28, 29. At the same time the ply 29a, Fig. 9, between the edge 28a of the tongue and the end 29b of the slot, Fig. 9, permits the lateral shifting of the journal bearing 25, 26, 27 in the direction of and along median M of slots 29, Fig. 6. As apparent from the above the median M of slot 29 together with the center O, Figs. 1, 8, 9, of the bearing means 13, 21 will during operation of the propeller define a surface of predeterminable shape and orientation along which the otherwise freely movable axis E is constrained to move. The direction of this lateral movement and the orientation of this surface may, for instance, be varied by rotation of shell 21 about the radial axis of bearing shell 13, which axis coincides with the radial axis of shell 21. As shown in Fig. 1, this axis coincides with axis E of the journal bearing 25, 26, 27; this, however, is only incidental, as apparent from Figs. 8, 9. With the foregoing construction, it will be apparent that the eccentric mounting of the blade bolt 14 in the journal bearing of the spherical shell 24 will have the same effect as if the blade bolt were made to turn about the central axis E of the bearing ring 26 on the end of an ideal crank or lever of a length corresponding with the distance $Z^1$ which also is a measure for the angle Z between the axis E and H, see Fig. 1. This eccentric mounting of the slot and tongue arrangement between the axis H of the blade bolt and the axis E of the journal ring 26 permits an equilibrium adjustment between the forces of thrust and torque and the centrifugal force of the blade which cooperate to force the blade bolt to execute a rotation about the eccentric axis E and thus change the pitch of the propeller blade. The theory supporting this statement and necessary to determine the position of the slots 29, the distance $Z^1$ or the corresponding angle Z between the axis E of the journal ring 26, and the central axis H of the blade bolt 14 equal to the length $Z^1$ of the ideal crank, and the angle A, Fig. 7, which the center line of this crank makes with the cords of the blade air foil sections will be explained later. A number of alternative arrangements may be utilized for controlling the position of the spherical shell 21 and the median M of slots 29 and thereby the orientation of the surface along which axis E moves. If desired, this direction of movement may be along a fixed path during flight as determined by the position of the slots 29—29, or suitable means for adjusting the direction of the slots by rotation of the shell 21 may be provided, such means being adjustable when the engine is not running or adjustable during flight.

This rotational movement of the shell 21 and the change in direction of the slots 29—29 may as another alternative be confined by suitable stops to movement between predetermined limit positions. For controlling the movements between these limit positions, there may be provided as shown in Figure 5, an annular bevel gear 30 which is concentrically disposed around the propeller shaft and mounted for rotational movement with a supporting sleeve 31 upon a tubular extension 32 of the propeller hub. For such purpose, bearing rings 33—33 may be provided and protective rings 34—34 of felt or other suitable material utilized to protect the bearing support for the sleeve 31 against the entrance of dust and the like.

The gear 30 is in meshed relation with the bevel gear 22 at each propeller blade support, so that actuation of the gear 30 will simultaneously adjust each propeller blade by means of the slots 29 and tongues 28.

The disposition of the slots 29—29 is normally retained at one of its limit positions by means of a coiled spring 35 which is interconnected between the sleeve 31 and hub extension 32. Movement of the slot direction to its other limit position corresponding to reversed thrust position of the propeller blade may be effected by suitable means for opposing the action of the spring 35. For such purpose a brake band 36 may be operatively associated with the sleeve 31, this brake band having its ends respectively connected to the ends of a rocker arm 37 carried by a shaft 38 which may be actuated by the pilot from the cockpit whenever it is desired to secure reversed thrust operation of the propeller. Of course, upon releasing the brake band, the spring 35 will return the slot to its normal position. The action of the rotation of the slots to effect reverse thrust may be explained as follows. The axis H of the blade bolt being eccentric of the axis E of the journal bearing would be forced backward by the rotation of the slots but for the centrifugal force of the blade which in order to keep the blade in equilibrium position, forces it to rotate about axis E forward and thus to diminish the pitch angle so far as to produce thrust forces acting backward.

Another arrangement may be provided which will allow adjustment of the slot direction to any desired position for either normal or reversed thrust while the airplane and propeller is flying. In the arrangement shown in Figure 1, this is accomplished by means of a differential gear arrangement wherein the hub extension 32 is formed with a fixed ring gear 39, and supported upon this gear by means of a bearing ring 40 is a rotatably mounted ring gear 41 in concentric relation to the gear 39. The gear 41 has one set of teeth meshing with the gear 22 and another set of teeth arranged to mesh with an idler pinion 42 mounted on a movable ring 43, this pinion having its axis of rotation at right angles to the axis of rotation of gear 41.

The ring 43 is rotatably supported on a bearing ring 44 mounted on a stationary structure 45 which may be secured to or formed as part of the engine housing.

Meshing with the teeth of the gear 39 is a second pinion 46 similar to the pinion 42. The pinion 46, however, is mounted with its axis of rotation fixed which may be done by mounting the gear on a portion of the structure 45.

The pinions 42 and 46 respectively mesh with concentrically disposed rows of teeth on a ring gear 47 also concentrically disposed of the propeller shaft and mounted for rotational movement on the structure 45 as by an anti-friction bearing as shown at 48. If desired, a sealing ring of felt or other suitable material as shown at 49 may be provided between the ring 43 and the associated surface of gear 41.

The ring 43 and consequently the position of pinion 42 may be adjusted circumferentially of the propeller shaft by means of a rack member 50 having sliding mounting in the structure 45, this rack member having teeth for engaging a row of teeth formed on the ring 43.

The operation of the differential gear arrangement will now be explained. With the direction of the slots 29 orientated to a desired position as governed by the adjustment of the rack 50, during rotation of the propeller the movement of gear 39 will act through the pinion 46 to rotate the gear 47 in a direction opposite to that in which the propeller is rotating. The gear 47, so long as the ring 43 is retained in fixed position, will drive the gear 41 in a direction opposite that in which the gear 47 is being rotated, or in other words, the gear 41 will then be rotating in the same direction and at the same speed as gear 39 which is the direction in which the propeller is rotating. Since there is no relative movement at this time between the gears 39 and 41, there will be no change in the position of the spherical shell 21 or the direction of the slot 29. However, the position and direction of this slot may be readily adjusted at any time by the pilot simply by moving the rack 50, which will rotate the ring 43 and carry with it the axis of the pinion 42. Shifting movements of the ring 43 will thereupon pull the pinion 42 over the associated teeth of gear 47, which is rotating at the same speed in the opposite direction as the propeller, and by virtue of its engagement with the gear 41 cause relative movement of the latter to gear 39 in the direction of rotation of the propeller or a reverse direction depending upon which direction the rack 50 is moved. This movement of the gear 41 will act through gear 22 to rotate the spherical shell 21 and thus change the direction of the slot and the conditions under which equilibrium between the acting forces will be established for the different pitch positions of the blade.

Operation

The operation of the blades under changes in flying conditions or changes in the stages of flight will now be explained.

In determining the various positions assumed by the blades upon change from one stage of flight to another, independently of any mathematical consideration, the relatively movable parts of the structure must be correlated with the change in the forces of torque, centrifugal force and thrust.

First the blade 15 (referring to Figure 1), together with the blade bolt 14, nut 19 and shell 24, are free to rotate on bearings 20 relative to the shell 13 of the journal member 18. This relative rotation, as will be understood, allows changes of the pitch of the propeller blade, which changes, as will be seen presently, are enforced by virtue of the eccentric relationship of the longitudinal axis of the blade to the bearing system 24—26 and by the slot-tongue arrangement 28—29.

Because of the tongues 28 and their sliding engagement in the slots 29, the blade is tilted additionally so that its axis is disposed at a small additional angle relative to the radial axis through the spherical shell 13. The importance of the angularity in amount and direction, in compensating for centrifugal force torque, and thrust will be seen presently.

From the foregoing it will be seen that, because of the tilt or angularity of the blade axis, the longitudinal axis of the blade will not serve as the primary axis of rotation for the blade since it is not coincident with the radial axis of the sphere 13. Instead, the axis of the blade will prescribe the surface of a cone about the axis of the bearing 24—25 which itself is free to move along the slot 29, when the blade, hub and nut 19 rotate without any constraint other than that against centrifugal force relative to the journal 18 and sphere 13 on the bearings 20. Under these circumstances, the movement of the blade will be somewhat like that of a horse on a merry-go-round, it will travel in an arcuate path and at the same time the angular position thereof will change. In addition it may be remembered that the axis of the propeller blade is allowed to tilt freely along a path transverse to itself, that it is under the action of the forces of thrust and torque transverse to the axis and of its centrifugal force nearly but not exactly along the axis, so that the center of gravity of the blade, in contradiction to the aforementioned horse, is perfectly free to assume, without any constraint, its equilibrium position dictated by the above named three forces. Thus in the present construction, change in pitch angle is not accomplished solely through a twisting of the blade about its longitudinal axis, but is accomplished by movement through an arcuate path about the shifting axis of the bearing system 24—25.

Since the axis of the blade is disposed at an angle to the axis of the bearing system 24—25 and this again moves freely along slot 29, it will be seen that centrifugal forces impressed on the blade during flight will urge the blade axis toward radial position.

Any such tendency does not result in such coincidence being attained but merely results in a rotation of the blade system about the axis of the bearing system 24—25, because of the influence of thrust and torque and as shown heretofore, such rotation causes changes in the pitch of the propeller.

Engine torque causes the propeller shaft to lead the blades, thus causing relative movement between the blade and the radial axis of the respective sphere 13. According to the angular position of the slot 29 this lagging of the blades or leading of the propeller shaft either accentuates or retards the effect of the eccentric bearing 24—25 through the influence of centrifugal force and thrust.

Thrust likewise impresses forces upon the blade which constrain the blade body and bolt through the conoidal paths, thus effecting a change in pitch of the blade.

From the foregoing it will be seen that all of the forces impressed upon the blade during flight, that is, centrifugal force, thrust and torque, have the same effect upon the blade, namely, to create change in the position of the longitudinal axis of the blade on the respective, theoretical conoidal surface in accordance with their intensity relative to one another (equilibrium) to effect a resultant change in pitch angle.

In view of these variable factors (intensity of centrifugal force, torque and thrust) and the infinite variety of combinations of equilibrium thereof due to slight changes in one or the other, each change resulting in a change in the pitch angle of the blade, it will be seen that knowledge of the precise position of the blade at any one time is not important, since, due to the novel structures here provided, any given position will be the optimum for the given intensity of centrifugal force, torque and thrust at that particular moment if only the required number of revolutions is complied with. The pilot is concerned, not so much with the actual pitch of the blades, but rather with the optimum performance obtained by compliance with the prescribed R. P. M. requirement which may change from one stage of flight to another. However, the general pitch position of the blades can be explained as a result of the respective equilibrium conditions existing during the different states of flight, as enforced by the adjustable values of the angles Z, A, B in Figs. 1, 3, 6, 7, 8 and 9 which are calculated beforehand in accordance with the mathematical formulae set forth in a later part of this specification.

Assuming first that the plane is landed and the motor is shut off, the blades are not influenced by any of the above named forces and thus they assume an irregular or random position relative to the sphere 13.

As the motor is started and through the "take-off" stage, a high thrust condition exists together with high torque, as allowed to the pilot for a short time in accordance with engine endurance, the centrifugal force being directly proportional to the square of the R. P. M. developed. Under these conditions of maximum thrust and torque the blades, free to move relative to the shell 13 in the manner and through the conoidal path above described, assume a position of low pitch.

As the plane passes from "take-off" to the "climbing" stage, the thrust component must decrease with increasing forward velocity according to a general property of all screw propellers while the torque is reduced by the action of the pilot on the gas throttle in accordance with engine endurance requirements, with the result that the blade moves to assume a position of increased pitch, that is, the angle between the chord of the blade and the longitudinal axis of the propeller shaft is increased.

As the plane reaches the stage of "top speed," thrust is further decreased and the blade assumes a position of further increased pitch, that is, with a further increase in the angle between the blade chord and the longitudinal axis of the propeller shaft.

During diving, thrust becomes negative and the blade assumes a feathering position wherein the blade chord is substantially parallel with the longitudinal axis of the propeller shaft. Thus it will be seen that in passing through the flight stages from "take-off" to "diving" the equilibrium of the forces impressed upon the blades causes compensating movements thereof from low pitch to feathering position whereby the required engine R. P. M. for each stage of flight is obtained.

It will be understood that throughout the above automatic movements or adjustments, centrifugal force has likewise been acting upon the blades in accordance with its intensity relative to the thrust to determine pitch position of the blades.

In changing from one of the four principal stages of flight above described to the next succeeding stage or in passing through that stage, it has been found that in some instances the optimum position of pitch of the propeller blades is not attained with the result that the pilot experiences a deviation in developed engine R. P. M. Under such circumstances it is merely necessary for the pilot to operate the rack 50 of the differential mechanism one way or the other until the desired R. P. M. is attained whereupon the adjustment is completed.

It is obvious that while four principal stages of flight have been discussed herein, many intermediate stages are passed through in passing from, for instance, "take-off" to "cruising" or from "cruising" to "top speed." Since, as will be seen presently, adjustments for the four stages of flight have been provided, the differential may likewise be adjusted to accommodate the mechanism to these intermediate stages of flight or for very high altitude. A still further attribute of the differential mechanism is found in connection with multi-propeller aircraft. In such aircraft the differential mechanism may be adjusted in order that perfect synchronism between the various engines be attained.

Finally, the rack and the differential serve also to bring the propeller into reverse thrust position as described heretofore. All of these changes are not forcefully produced, but only by changing the condition of free equilibrium by a change of the adjustment, in this case the angular position of the outermost shell which determines the direction of the slot 29, shown in Figure 6.

As a modification of the spherical bearing support for the propeller blade, the construction shown in Figure 1 may be modified to that shown in Figure 3 for one of the propeller blades of a counter-rotating propeller assembly. In the modified construction, the anti-friction members 20 are dispensed with and the previous nut 19 and journal member 18 are constructed as a single member 18' which may be secured to the bolt 14 in the same manner as the nut 19. Anti-friction bearing means in the form of ball bearings 51 supported in a spherical cage 52 are disposed between the bearing surface of the member 18' and the spherical shell 13. This arrangement simultaneously permits the rotation and tilting motions of the bolt 14 in the manner previously described.

Although the nut 19 and member 18' have been shown in Figures 1 and 3 as being of one-piece construction and threadedly secured to the bolt 14, it may be desirable in some cases to eliminate such a threaded connection. This may be done by forging or otherwise providing an integral head portion at the innermost end of the bolt and making the nut 19 or member 18' of two-part construction, the parts thereof being so arranged that they may be clampingly secured in position on the bolt above the head portion.

The feature of utilizing differential gearing for controlling the orientation of the slots 29, while the propeller is running, is equally adaptable to a propeller system utilizing counter-rotating propellers.

Referring to Figure 3, there is disclosed a counter-rotating propeller assembly embodying the features of the present invention.

In the arrangement disclosed, the hub of the forward propeller A' is extended to form an elongate sleeve 32'' which is secured in the usual manner directly to the engine shaft 11 or the shaft of a reduction gear of the engine.

A hub 53 supports the rear propeller as indicated at B' for independent rotation relative to the shaft 11 and sleeve 32", the hub 53 being provided with a journal bearing 54 and thrust bearing 55.

For driving the counter-rotating propeller in the proper direction, there is provided in connection with the hub 53 an internally toothed ring gear 56 which extends concentrically around the shaft 11. The rear end of the sleeve extension 32" is externally toothed to form a gear 57 at this end of the hub extension of propeller A'. The gears 56 and 57 are interconnected through a double spur idler gear, as generally indicated at 58, this gear being mounted in the structure 45 on an axle 59. This double spur gear has one set of teeth meshing with the teeth of gear 56 and another set of teeth meshing with the gear 57. The double spur gear is so dimensioned as to impart a rotation in the reverse direction to propeller B' but at the same speed as the rotation of the propeller A'. It will be appreciated of course that this drive could be effected by means of a bevel gear and the counter-rotating propeller could also be driven at a different number of revolutions on account of the rotation of the slip stream behind the front propeller if found expedient to do so for aerodynamic efficiency.

The differential adjusting mechanism for simultaneously adjusting both propellers of the counter-rotating propeller assembly comprises, as shown in Figure 3, a gear 41' which is similar to the gear 41 except that in this case it carries an externally toothed ring gear 60, which may be rotated with the gear 41' relative to the hub of the forward propeller. Associated with the hub of the rear propeller is a similar ring gear 41" which is associated with a ring gear 61 which is in concentric relation with the ring gear 60. The gears 60 and 61 are interconnected by means of a double spur gear 62 of proper ratio to compensate for the difference in diameters of the gears 60 and 61. The spur gear 62 is supported for rotation on the flanged end of a sleeve 63 interposed and rotatably mounted on suitable bearings between the sleeve 32" and the bearing mounting for the hub of the rear propeller. The sleeve 63 in this case is provided at its opposite end with a row of teeth which in effect form a gear 64 adapted to mesh with a toothed rack 65 supported in the structure 45 for reciprocable movement.

The operation of the foregoing arrangement will now be described. With the propellers A' and B' rotating in opposite directions and the sleeve 63 held against rotation by the adjustment of the rack 65, the ring gears 60 and 61 will rotate in opposite directions and the spur gear 62 which is engaged on opposite sides by the teeth of the gears 60 and 61 will merely rotate on its axis. However, upon rotation of the sleeve 63, the spur gear will function to move the gears 41' and 42' in such direction as to rotate the associated spherical shells 21—21 of the forward and rear propellers in opposite directions and thus orient the direction of the slots 29 therein. It will of course be understood that the gears 41' and 41" engage the associated gears 22 of the spherical housings for each propeller blade mounting in both the forward and rear propellers.

While in Figures 1, 2 and 3 the racks 50 and 65 have been shown with teeth only on one side and mounted only for reciprocable movements, it is possible to make these racks in the form of worms which are mounted for reciprocable and rotary movements, the reciprocable movements permitting rapid major adjustments and the rotary movements enabling minor adjustments to be made at slower speeds. Thus, the reciprocable movements of the racks may be controlled through suitable actuating means, whereby rapid adjustment may be obtained, as for example, when reverse pitch of the propeller is desired. The rack may also be connected through suitable means to a governor in such a manner that the governor will act to rotate the rack and thus effect minor adjustments of the mechanism.

Referring now to Figures 6 and 7, the theoretical consideration of determining the position of the slots 29, the length Z' of the ideal crank between the center of the journal ring 26 and the center of the bolt 14, and the angles between the cords of the blade air foil sections and the line connecting these two centers will now be explained. It should be noted in the following discussion that this theoretical consideration presupposes that the centrifugal couples acting on the blades are balanced in some suitable manner as by counterweights or otherwise.

The position of equilibrium of the propeller blades for one of the states of flight may be indicated by the distance coordinates $f$ and $g$, where $f$ is the distance from the plane $r$ of rotation (which is perpendicular to the engine shaft) to that point of the center line of the blade bolt 14 where it touches the center plane of the bearing ring 26, and $g$ is the distance of this point as generally indicated at $c$ from the plane $v$ containing the center line of the engine shaft.

This equilibrium is established between the force moments of the thrust and torque and the centrifugal force moment about the axes passing through the center of the spherical bearing. These forces, the distances $f$ and $g$ and an angular position $\phi$ representing the pitch angle of the blade, form a system of co-related values which can be assumed to be known for this state of flight, as well as other systems of values for other states of flight which are also known either from experiments or from theoretical calculations.

Letting $d$ indicate the center of the journal ring 26, see Figs. 6 and 7, the length of the ideal crank connecting the centers $c$ and $d$ where the axes H and E of the blade bolt and of the bearing cut through the median plane of the journal ring 26 may then be represented by Z', the inclination B of the slot 29 allowing the bearing 26 to slide and the angle A between the ideal crank and a representative blade face can be fixed in such a way that three systems of values say $f_n$, $g_n$, $\phi_n$, belonging to three prescribed states of flight are enforced by one and the same crank length Z', crank angle A and slot angle B.

In fact, for any system of values $f_n$, $g_n$, $\phi_n$, the following relation between them and the one fixed ideal crank length Z', the one fixed angle A and the one fixed inclination B of the slot can be mathematically stated as follows:

$$Z \sin(A+B-\phi_n) = f_n \cos B + g_n \sin B$$

so that, if Z', A and B are considered as the three quantities to be determined, three sets of values $f_n$, $g_n$, $\phi_n$, can be taken from three states of flight and be prescribed, and from them the three values of Z', A and B calculated.

It will be further evident that, if more than three sets of values $f_n$, $g_n$, and $\phi_n$, shall be prescribed, then either the value of the slot inclination B must be changed by an angular displacement of the slot, or the slot itself must follow a curve instead of being straight as shown and preferred in the present disclosure of the invention. In principle a change in the angle A determined by the bolt connection with the shell 24 would also be effective but less convenient.

Besides these three states of flight there are two other blade positions which may be realized, namely, the position of feathering and the position of reverse thrust.

The first position is obtained automatically in a flight or glide of the plane, when the propeller has ceased to rotate or is rotating very slowly without driving engine torque. In this state the air resistance of the blades pushes them backwards and by the eccentricity of the blade axis H relative to the axis E of the bearing ring 26 turns the blades into such a steep angular position that they stop to rotate and experience the resulting smallest possible resistance. After the engine has been stopped during flight, it is often necessary to start it again by utilizing the windmill action of the propeller blades. This can be accomplished readily by manually turning the slot 29 into an angular position such that the action of the air resistance of the blade will push it into an angle sufficient to give it a windmill or cranking action.

The position of negative thrust is obtained while the engine is driving the propeller. The slot 29 must be turned around in such a way that it tends to push the blade bolt backward beyond the equilibrium position corresponding to the torque of the engine and the centrifugal force. This may be accomplished manually by control by the pilot as previously described. To regain the correct equilibrium position, the blade bolt is then automatically forced to rotate forward in the eccentric bearing 26 and this rotation, if the slot has been turned around far enough, will diminish the angle $\phi$ so far as to give negative thrust.

It is, of course, to be understood that although I have described in detail several embodiments of my invention, the invention is not to be thus limited, but only insofar as defined by the scope and spirit of the appended claims; and while the invention has been primarily described in connection with the usual airplane propeller, it will be appreciated by those skilled in the art that the invention may be advantageously utilized with autogyro and helicopter aircraft.

In Figures 8 and 9 in which the structure shown in Figure 1 is represented somewhat schematically, the disposal of the blade 15 and blade bolt 14 is in an exaggeratedly inclined position to show the features with greater clarity.

In Figures 8 and 9 the centroid axis of the blade bolt 14 and the propeller blade 15 is represented as H, while the centroid axis of the journal ring 26 is represented as E. As indicated previously, the ideal crank afforded by the angle between the aforementioned axes is represented at Z' which joins the intersection points c and d of axes H and E respectively, with a plane through the journal bearing 26. As indicated previously, the journal ring 26 is provided with tongues 28 which are arranged to slide in slots 29 formed in the shell 21.

The angle B which represents the angle of inclination of the slots 29 from the plane of rotation J of the hub assembly, as indicated in Figure 9, is defined on the one hand by the plane of rotation, and on the other hand by the plane of a great circle I through part of which the movement of the tongues 28, shell 24, blade bolt 14 and blade 15 takes place. This angle of inclination may be adjusted by rotation of the bevel gear 22 which is formed integrally with the shell 21 in which the slots 29 are formed.

As indicated previously, the shell 24, together with the blade 15, which is fixed thereto through the medium of the blade bolt 14 and the serrated connection 25b shown in Figure 1, is free to rotate upon the tiltable bearing 20. In so rotating the blade axis H prescribes a cone around the centroid axis E of the journal ring 26. This latter axis, however, is freely movable along a predeterminable path as defined by the slots 29 and tongues 28.

As shown in Figure 9, the driving shaft axis is represented at K and the direction of flight is toward the bottom of the drawing, while the direction of rotation of the propeller blade is toward the left of the sheet, assuming that the blade is traversing that portion of its arc of rotation which is above the plane of the drawing. Under such conditions, the direction of torque forces is toward the right of the sheet and the direction of the thrust forces is toward the bottom of the sheet. It will be seen thus that there is provided herein a structure in which the propeller blade 15 and the blade bolt 14, and particularly the centroid axis H thereof, is free, by movement of the shell 24 and nut 19 about bearing 20 (see Figure 1), to prescribe a cone about the centroid axis E through the journal bearing 26, this movement prescribing pitch change in the propeller blade. Additionally, the axis E of the prescribed cone is also freely movable under the influence of forces imposed thereon during flight by virtue of the cooperative movement between the tongues 28 and the slots 29, this movement, as has been previously described, being through a predeterminable path dependent upon the adjustment of the shell 21 having the slots 29 therein.

Thus, it will be seen that under the combined influences of torque, thrust and centrifugal force the axis H, which comprises substantially the centroid axis of the blade 15, may assume a position of equilibrium satisfying the total influence of these forces for the purpose to maintain a prescribed rotational speed. This is effected by moving through a cone prescribing path about the axis E, which comprises the centroid axis of the journal ring 26 and additionally by a free tilting of the axis E by virtue of cooperation between tongues 28 and slots 29. It will be understood that throughout all of this movement pilot control is unnecessary and that the entire motion of the blade is the result of the changing forces of thrust, torque and centrifugal force imposed thereon, the position of the blade at any one time being enforced solely by these forces and constrained by the above described mechanism and thus attaining the new position of equilibrium.

As explained previously in conjunction with Figures 6 and 7, the coordinate $f$ representing the distance from the plane of rotation which is perpendicular to the engine shaft to that point of the center line of the blade bolt 14 where it touches the center plane of the bearing or journal ring 26 and the coordinate $g$ which is the distance from this point of the center line of the blade bolt from the plane containing the center line of the engine shaft, represents a position of equilibrium as established between the force moments of thrust and torque and the centrifugal force moment about the axes passing through the center O of the spherical bearing.

As will best be seen from Figures 1 and 9, the ideal lever or crank arm Z' between the centroid axis of the journal ring 26 and the centroid axis of the blade bolt 14 in the center plane of journal ring 26 is established by virtue of the eccentricity between the central socket portion 25 of the shell 24, and the ring journal 26 on the one hand and the opening thereof and the blade bolt 14 on the other hand. The blade bolt 14 and shell 24 are rotatable independently of and about the journal ring 26 which is retained in a position but only against rotation by virtue of the tongues 28 and slots 29 in the shell 21 and thus this rotation of the shell 24 and the blade bolt 14, relative to the ring 26 which is held in the said position with respect to the shell 21 by virtue of the tongue and slot arrangement, affords movement of the ideal crank Z' about the point $d$ on the centroid axis of the bearing or journal ring 26. The point $d$, however, is freely movable along a predeterminable path as established by the slots 29 or the inclination thereof relative to the plane of rotation (see angle B) as regulated by operation of the bevel gear 22 on the shell 21.

I claim as my invention:

1. A variable pitch propeller for aircraft comprising a hub, a plurality of blades, bearing means carried by said hub supporting each of said blades for rotary movement in a fixed path about a freely movable axis disposed at an acute angle in relation to the centroid axis of the blades, said bearing means having parts constraining the free movement of the first axis along a surface of predeterminable shape and orientation, said surface having a point fixed in relation to said bearing means.

2. A variable pitch propeller for aircraft comprising a hub, a plurality of blades, bearing means carried by said hub supporting each of said blades for rotary movement in a fixed path about a freely movable axis disposed at an acute angle in relation to the centroid axis of the blades, said bearing means having parts constraining the free movement of said first axis along a surface of predeterminable shape and orientation, said surface having a point fixed in relation to said bearing means, said bearing means having parts connected and cooperating therewith to variably adjust the orientation of the said surface along which the otherwise freely movable axis is constrained to move.

3. A variable pitch propeller for aircraft comprising a hub, a plurality of blades, bearing means carried by said hub supporting each of said blades for rotary movement in a fixed path about a freely movable axis disposed at an acute angle in relation to the centroid axis of the blades, said bearing means having parts constraining the free movement of said first axis along a surface of predeterminable shape and orientation, said surface having a point fixed in relation to said bearing means, and means operable during flight rotatably connecting said bearing means and the non-rotating part of the aircraft engine to simultaneously adjust said parts and the orientation of the surface along which the said otherwise freely movable axis is constrained to move.

4. A variable pitch propeller for aircraft comprising a hub, a plurality of blades, bearing means carried by said hub supporting each of said blades for rotary movement in a fixed path about a freely movable axis disposed at an acute angle in relation to the centroid axis of the blades, said bearing means having parts constraining the free movement of said first axis along a surface of predeterminable shape and orientation, said surface having a point fixed in relation to said bearing means, means to adjust the orientation of said surface between predetermined limit positions, spring means to normally confine the adjustment of said surface to one of said limit positions and means including a brake operable against the action of said springs to move said surface into another limit position.

5. A variable pitch propeller for aircraft comprising a hub, a plurality of blades, bearing means carried by said hub supporting each of said blades for rotary movement in a fixed path about a freely movable axis disposed at an acute angle in relation to the centroid axis of the blades, said bearing means having parts constraining the free movement of said first axis along a surface of predeterminable shape and orientation, said surface having a point fixed in relation to said bearing means, and differential gear means functionally connected with said bearing means operable during flight to simultaneously adjust said parts and the orientation of said surface along which the said otherwise freely movable axis is constrained to move.

6. A variable pitch propeller for aircraft comprising a hub adapted for connection with the driving shaft, a plurality of blades having blade bolts, a part spherical bearing carried by said hub provided with a central aperture for said blade bolts and a journal bearing freely movable on said spherical bearing also provided with a central aperture for said blade bolts, said bearing supporting each of said blades for rotary movement in a fixed path about the axis of the freely movable journal bearing, said axis being disposed at an acute angle to the axis of the blade bolt, said journal bearing having parts constraining the free movement of axis of said journal bearing along a surface of predeterminable shape and orientation, said surface having a point fixed in relation to said spherical bearing.

7. A variable pitch propeller for aircraft comprising a hub adapted for connection with the driving shaft, a plurality of blades having blade bolts, a part spherical bearing carried by said hub provided with a central aperture for said blade bolt, a part spherical shell mounted on said spherical bearing for rotational movement about an axis extending through the center of said spherical bearing, said shell being provided with a central inwardly opening socket adapted to hold said blade bolt, a journal bearing freely movably located inside of said socket on said spherical bearing provided with an eccentric aperture for the blade bolt, said bearing supporting each of said blades for rotary movement in a fixed path about the axis of the freely movable journal bearing, said axis being disposed at an acute angle to the axis of the blade bolt, said journal bearing having parts constraining the free movement of axis of said journal bearing along a surface of predeterminable shape and orientation, said surface having a point fixed in relation to said spherical bearing.

8. A variable pitch propeller for aircraft comprising a hub adapted for connection with the driving shaft, blades having blade bolts, a part spherical bearing provided with a center aperture for the passage therethrough of said blade bolt, said bearing including a part spherical shell rigidly mounted on said hub, and a second part spherical shell rotatably supported on and embracing said first shell, a journal bearing also provided with a center aperture located freely movable on said second spherical shell, said bearing supporting said blades for rotary movement in a fixed path about the freely movable axis of the said journal bearing, said axis being disposed at an acute angle in relation to the centroid axis of the blades, and means connecting said journal bearing and said second shell together for connected rotational movement, but enabling independent lateral movements of the axis of the journal bearing along a surface of predeterminable shape and orientation, said surface having a point fixed in relation to said spherical bearing.

9. A variable pitch propeller for aircraft comprising a hub adapted for connection with the driving shaft, blades having blade bolts, a part spherical bearing provided with a center aperture for the passage therethrough of said blade bolts, said bearing including a part spherical shell rotatably supported on and embracing said first shell, a journal bearing also provided with a center aperture located freely movable on said second spherical shell, said bearings supporting said blade for rotary movement of its axis in a fixed path about the freely movable axis of the said journal bearing, said axis being disposed at an acute angle in relation to the centroid axis of the blades, said journal bearing having a journal ring provided with outwardly extending tongues, slots in said second spherical shell for displacement of said tongues, the free movement of the centroid axis of said journal bearing being constrained by the cooperation of said tongues and slots along a surface of predeterminable shape and orientation, said surface having a point fixed in relation to said spherical bearing.

10. Counter-rotating variable pitch propellers for aircraft comprising a common driving shaft, means connecting one of said propellers for direct rotation with said shaft, means for connecting the other of said propellers to the shaft for rotation in a reverse direction, annular gears respectively carried by said propellers, said annular gears being concentrically disposed of the driving shaft and mounted for concerted and independent movements relative to their associated propellers, an idler gear meshing with and interconnecting said annular gears, means for adjustably shifting the axis of rotation of the idler gear circumferentially of the driving shaft, and blade pitch adjusting means respectively associated with said propellers for actuation by the independent movements of their associated annular gears in response to the shifting of the idler gear axis.

HANS REISSNER.